(12) United States Patent
Tsuji (10) Patent No.: US 8,559,722 B2
(45) Date of Patent: Oct. 15, 2013

(54) IMAGE RECOGNITION APPARATUS AND METHOD

(75) Inventor: Ryosuke Tsuji, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 456 days.

(21) Appl. No.: 13/020,438

(22) Filed: Feb. 3, 2011

(65) Prior Publication Data

US 2011/0194732 A1 Aug. 11, 2011

(30) Foreign Application Priority Data

Feb. 10, 2010 (JP) ................................ 2010-028207

(51) Int. Cl.
*G06K 9/00* (2006.01)
*G06K 9/70* (2006.01)

(52) U.S. Cl.
USPC ............ 382/181; 382/103; 382/218; 382/226

(58) Field of Classification Search
USPC .................................. 382/181, 103, 218, 226
See application file for complete search history.

(56) References Cited

U.S. PATENT DOCUMENTS

| 5,450,504 A * | 9/1995 | Calia .............................. 382/118 |
| 2002/0103574 A1 | 8/2002 | Funada |
| 2009/0067726 A1 * | 3/2009 | Erol et al. ...................... 382/197 |
| 2009/0309702 A1 | 12/2009 | Hirai |

FOREIGN PATENT DOCUMENTS

| JP | 2002-251380 | 9/2002 |
| JP | 2003-187352 | 7/2003 |

OTHER PUBLICATIONS

Lee, et al. "Measurement of Face Recognizability for Visual Surveillance." ICAPR 2005, LNCS. 3687. (2005): 287-294. Print.*
The above references were cited in a Dec. 29, 2011 European Search Report which is enclosed of the counterpart European Patent Application No. 11152123.3.

* cited by examiner

*Primary Examiner* — Michael A Newman
(74) *Attorney, Agent, or Firm* — Cowan, Liebowitz & Latman, P.C.

(57) ABSTRACT

An image recognition apparatus detects a specific object image from an image to be processed, calculates a coincidence degree between an object recognizability state of the object image and that of an object in registered image information, and calculates a similarity between the image feature of the object image and the image feature in the registered image information. Based on the similarity and coincidence degree, the image recognition apparatus recognizes whether the object of the object image is that of the registered image information. When the similarity is lower than the first threshold and the coincidence degree is equal to or higher than the second threshold, the image recognition apparatus recognizes that the object of the object image is different from that of the registered image information.

11 Claims, 6 Drawing Sheets

IMAGE RECOGNITION APPARATUS AND METHOD

BACKGROUND OF THE INVENTION

1. Field of the Invention

The present invention relates to an image recognition apparatus and method suited to an image capturing apparatus such as a video camera.

2. Description of the Related Art

There has been recently proposed an image capturing apparatus having an object recognition function of recognizing a specific object contained in an image. With the object recognition function, the image capturing apparatus can control the focus and exposure preferentially for a recognized object. The image capturing apparatus having the object recognition function first detects an object image region containing a specific object from image data obtained by object recognition processing by the image capturing apparatus. Then, the image capturing apparatus extracts feature information from the image data of the detected object image region to identify the object region as a recognition target. The image capturing apparatus compares the extracted feature information with that of an image registered in advance in a database. Based on the similarity obtained by the comparison, the image capturing apparatus recognizes a registered target which corresponds to the recognition target, or determines whether no corresponding registered target exists.

For example, Japanese Patent Laid-Open No. 2003-187352 proposes a system which performs personal recognition to detect a person's face as a specific object region, extracts feature information of the face, and determines the person having this face. In this specification, processing of identifying the person (object) corresponding to a detected image such as a face will be called "recognition".

As described above, in object recognition, the similarity is calculated by comparing a recognition target with a target registered in advance in a database. A predetermined threshold is set for similarity to be calculated. If the calculated similarity is equal to or higher than the predetermined threshold, it is determined that the recognition target coincides with a target in the registration database.

When feature amounts obtained from the image of the recognition target and the image of the target in the registration database are almost equal, the similarity is high. However, even when the recognition target and the target registered in the database represent the same object, if the object status such as the object direction or brightness has changed, feature amounts (i.e. characteristics of the object and target that are compared) obtained from the target images differ from each other, and the similarity becomes low. The similarity becomes lower than the predetermined threshold because (1) the recognition target does not coincide with a target registered in the database, or (2) the status of a target registered in the database does not coincide with that of an object serving as the recognition target. That is, it cannot be determined from only the similarity value that the recognition target is an object not registered in the database.

SUMMARY OF THE INVENTION

It is desirable to solve the above problems, and an embodiment of the present invention provides an image recognition apparatus and method intending more accurately to determine that an object detected from an image has not been registered in a database.

According to one aspect of the present invention, there is provided an image recognition apparatus configured to recognize an object in an input image, the apparatus comprising: a database in which an image or an image feature obtained by imaging an object, and an object recognizability state of the object are registered as registered image information in association with an identification of the object; a first calculation unit configured to calculate a coincidence degree between an object recognizability state of the object image and an object recognizability state in the registered image information; a second calculation unit configured to calculate a similarity between an image feature of the input object image and an image feature in the registered image information; and a recognition unit configured to execute recognition processing to recognize, based on the similarity and the coincidence degree, whether an object of the input object image is the same object as the object of the registered image information, wherein when the second calculation unit calculates that the similarity is lower than a first threshold and the first calculation unit calculates that the coincidence degree is equal to or higher than a second threshold, the recognition unit is configured to recognize that the object of the input object image is different from the object of the registered image information.

Also, according to another aspect of the present invention, there is provided a method of controlling an image recognition apparatus which recognizes an object in an input image, the method comprising: a registration step of registering an image or an image feature obtained by imaging an object, and an object recognisability state regarding the object, as registered image information in a database in association with an identification of the object; a first calculation step of calculating a coincidence degree between an object recognisability state of the object image and an the object recognisability state in the registered image information; a second calculation step of calculating a similarity between an image or image feature of the object image and an image feature in the registered image information; and a recognition step of executing recognition processing to recognize, based on the similarity and the coincidence degree, whether an object of the object image is the same object as the object of the registered image information, wherein, when it is calculated that the similarity is lower than a first threshold and the coincidence degree is equal to or higher than a second threshold, the object of the object image is recognized in the recognition step to be different from the object of the registered image information.

Further features of the present invention will become apparent from the following description of exemplary embodiments with reference to the attached drawings.

DESCRIPTION OF THE EMBODIMENTS

Preferred embodiments of the present invention will now be described with reference to the accompanying drawings.

First Embodiment

Figure 1:
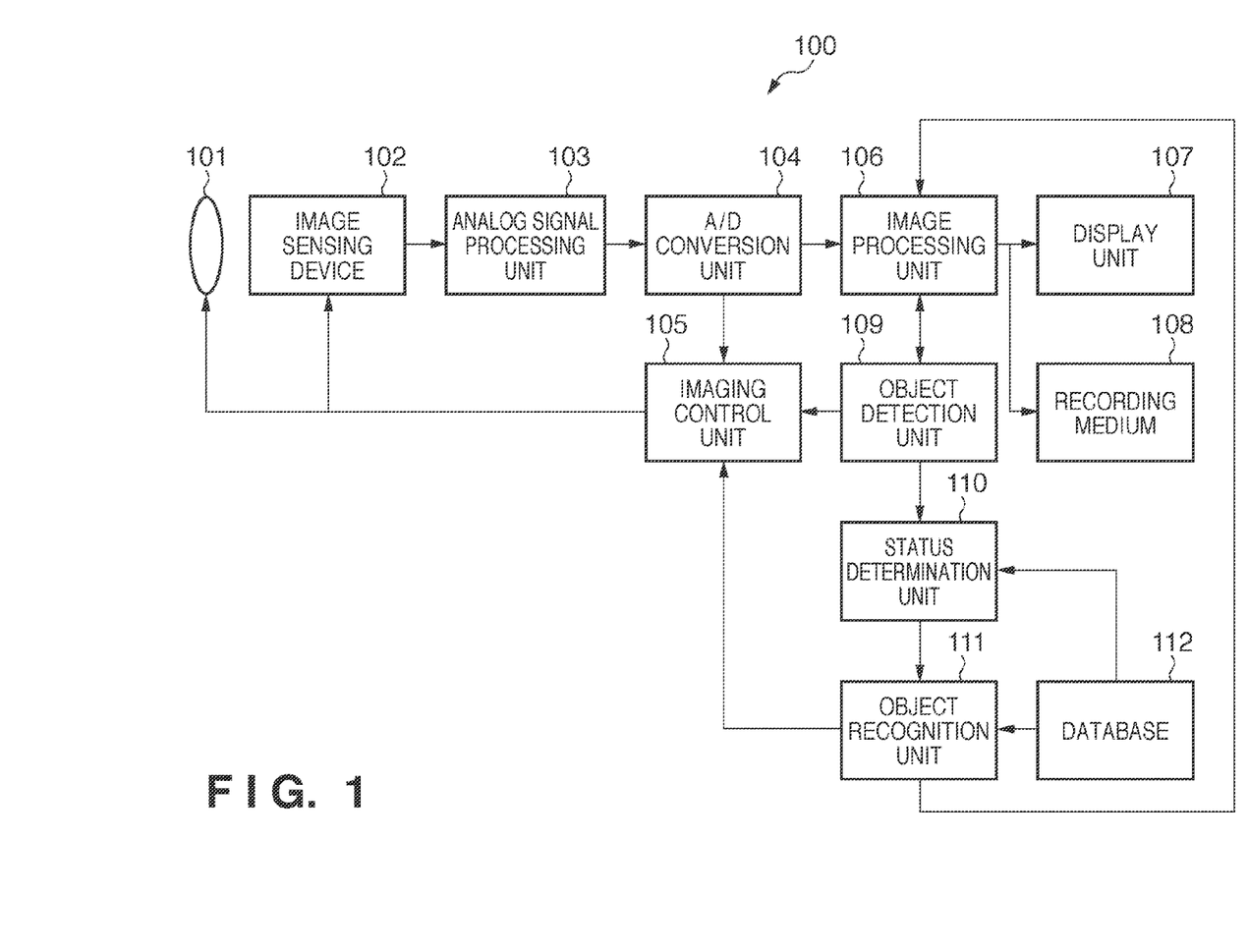
FIG. 1 is a block diagram exemplifying the arrangement of an image capturing apparatus according to the first embodiment.

FIG. 1 is a block diagram showing the schematic arrangement of an image capturing apparatus 100 having an image recognition apparatus according to the first embodiment. The image capturing apparatus 100 has a function of performing face-recognition to detect a person's face as a specific object region from the image data obtained by image sensing, extract feature information of the face, and identify the person having this face.

A light beam representing an object image converges through an imaging lens 101, and enters an image sensing device 102 such as a CCD (charge-coupled device) image sensor or CMOS (complementary metal-oxide semiconductor) image sensor. The image sensing device 102 outputs an electrical signal for each pixel in accordance with the intensity of the incident beam. This electrical signal is a video signal. An analog signal processing unit 103 performs analog signal processing such as correlated double sampling (CDS) for the video signal output from the image sensing device 102.

An A/D conversion unit 104 converts the video signal output from the analog signal processing unit 103 into digital data, generating a digital image. The digital image is input as an image to be processed to an imaging control unit 105 and image processing unit 106. The image processing unit 106 executes image processing including gamma correction and white balance processing for the input image to be processed. In addition to general image processing, the image processing unit 106 has a function of performing image processing using information about a specific object region in an image that is supplied from an object detection unit 109 and an object recognition unit 111 (to be described later). The video signal output from the image processing unit 106 is sent to a display unit 107. The display unit 107 is, for example, an LCD (liquid crystal display) or organic EL (electroluminescent) display, and displays a video signal. The display unit 107 can function as an electronic viewfinder (EVF) to sequentially display images detected in time series. The video signal is recorded on a recording medium 108 (for example, a removable memory card). Note that the recording destination may be the built-in memory of a camera, a memory inserted into the camera, or a communicably connected external device.

The video signal (input image to be processed) output from the image processing unit 106 is also supplied to the object detection unit 109. The object detection unit 109 detects a specific object in the image, and specifies the number of objects and the object region. As described above, the target object in the embodiment may be a person's face. The detection method can thus be a known face detection method. Known face detection techniques include, for example, a method using knowledge (skin color information and parts such as the eye, nose, and mouth) about the face, and a method which configures an identification unit for face detection based on a learning algorithm typified by the neural net. For high detection precision, a plurality of face detection methods are generally combined to perform face detection. An example is a method of performing face detection using wavelet transformation and the image feature amount, as described in Japanese Patent Laid-Open No. 2002-251380. Information output from the object detection unit 109 includes object positions, sizes, tilts, detection result reliabilities, and the like by the number of detected objects.

A status determination unit 110 accesses a database 112 to determine whether the status (i.e. a recognisability) of the recognition target in the object recognition unit 111 (to be described later) and that of a target registered in advance in the database 112 coincide with each other, or determine the coincidence degree. Details of the status determination unit 110 will be described later.

The object recognition unit 111 extracts feature information from the image data (object image) of the object detected by the object detection unit 109 to identify the object region as a recognition target. The object recognition unit 111 compares the extracted feature information with the feature information of an object image registered in advance in the database 112. More specifically, the object recognition unit 111 compares the image feature(s) of the object image with that of an object registered in the database 112. For example, by using information about face parts extracted upon face detection, the object recognition unit 111 obtains values for a plurality of types of items such as the distance between the centers (e.g. pupils) of the right and left eyes, the average of the sizes of the right and left eyes, the gradient of a straight line connecting the center of the eye and the corner of the eye with respect to a straight line connecting the centers of the right and left eyes, the width of the mouth, the distance from a bisecting point between the centers of the right and left eyes to the tip of the nose, and the distance from the bisecting point between the centers of the right and left eyes to the tip of the chin. The object recognition unit 111 normalizes the value of each item so that the value of any item (for example, the distance between the centers of the right and left eyes) coincides with a predetermined value. The object recognition unit 111 converts the value of each item into points using a table prepared in advance. The object recognition unit 111 calculates the ratio of the points of different items for various combinations of items, including, for example, the ratio of the points of the average of the sizes of the right and left eyes to those of the distance between the centers of the right and left eyes, and the ratio of the points of the distance from the bisecting point between the centers of the right and left eyes to the tip of the chin to those of the width of the mouth. The object recognition unit 111 reads out ratio data of a person out of those of persons registered in advance in the database 112, and obtains the percentage (%) of each calculated ratio with respect to the readout ratio data. The object recognition unit 111 obtains the average of percentages (%) calculated for various combinations of items, and sets it as a recognition evaluation value for the person. The skilled person will understand that there are other ways of obtaining a recognition evaluation value and that the example given above is one example from several possibilities. Based on a recognition evaluation value indicating the similarity obtained by the comparison, the object recognition unit 111 recognizes a registered target which corresponds to the recognition target, or determines whether no corresponding registered target exists. For example, a predetermined threshold is set for the recognition evaluation value. When the obtained recognition evaluation value is equal to or larger than the predetermined threshold, it can be determined that the recognition target is a target registered in the database 112. The recognition evaluation value becomes smaller than the predetermined threshold in the following two cases:

(1) the recognition target is different from a target registered in the database 112, or (2) the recognition target coincides with a target in the registration database, but a recognition evaluation value that is equal to or larger than the predetermined threshold cannot be obtained.

The phenomenon in which the recognition target coincides with a target registered in the database 112, but a recognition evaluation value equal to or larger than the predetermined threshold cannot be obtained occurs when, for example, the status (for example, face direction) of the object in the image is different. In other words, the input object is not recognizable as being similar to the target registered in the database. For this reason, when the recognition evaluation value is smaller than the predetermined threshold and the status determination unit 110 determines that the statuses of the two targets coincide with each other (or the status coincidence degree is equal to or higher than a predetermined threshold, meaning that the recognizability of the object is similar enough that if they were the same object, this would be detected), the object recognition unit 111 determines that the recognition target is an object different from that in the database. In other words, it is not simply because one of the faces being recognized is turned away that the object recognition unit 111 is not finding the faces of the input and of the database as being similar. Rather, the fact that the faces are actually different is more reliably concluded.

The status in the status determination unit 110 is defined by factors which decrease the precision of the object recognition unit 111. The factors which decrease the precision of the object recognition unit 111 depend on the algorithm of the object recognition unit 111 and the like, so the status in the status determination unit 110 is defined based on the characteristics of the object recognition unit 111. Examples of the status or recognisability state are the face direction, brightness, expression, concealment degree (for example, whether an object wears spectacles or a beard), and object region size.

In the database 112, a target object image, or the image feature amount and object recognisability state for object recognition are registered in association with the object. By "object recognisability state", what is meant is that a composition of the image is registered. This composition may include a direction in which a person is facing (i.e. directly at the camera capturing the image or to one side or in profile). The object recognisability state may alternatively indicate if the object being imaged is partially obscured. In other words, the object recognisability state is the same as the object "status" described above. A plurality of objects may be registered in the database 112. Also, a plurality of data can be registered for the same object in the database. In this case, the object can be registered with a plurality of different statuses. Note that an object recognition image may be registered in the database 112. In this specification, the image feature amount and object recognisability state or the image registered in association with the object in the database 112 will be generically called "registered image information".

The imaging control unit 105 controls the focus control mechanism and exposure control mechanism (neither is shown) of the imaging lens based on the video signal output from the A/D conversion unit 104. When controlling the focus control mechanism and exposure control mechanism, the imaging control unit 105 can use information of the target object region extraction result that is supplied from the object detection unit 109 and the object recognition unit 111. Hence, the image capturing apparatus 100 has a function of performing image sensing processing considering information of a specific object region in a captured image. The imaging control unit 105 also controls the output timing, output pixel, and the like of the image sensing device 102.

The sequence of object recognition processing according to the first embodiment will be explained with reference to FIG. 2.

The image processing unit 106 reads, as an input image, an image obtained by digitizing, by the A/D conversion unit 104, a captured image obtained via the image sensing device 102 (step S201). The object detection unit 109 detects an object region in the input image (step S202). The status determination unit 110 and the object recognition unit 111 obtain the image of the object region detected by the object detection unit 109 as an object image to be recognized. As information of the result of detection by the object detection unit 109, the number of detection results, the position and size of each detection result in the image, the reliability of the detection result, and the like are obtained. The status determination unit 110 and object recognition unit 111 execute processes in steps S203 to S209 for each object extracted as a recognition target by the object detection unit 109. It is also possible to select a main object from a plurality of objects extracted by the object detection unit 109, and to perform the processes in steps S203 to S209 for only the selected object as a recognition target. The main object to be selected is, for example, an object having the largest evaluation value or an object having the largest area of the object region in detection of the object region (object image).

The status determination unit 110 calculates the status coincidence degree to determine the degree at which the status of the object extracted by the object detection unit 109 coincides with that of an object registered in the database 112 (step S203 (first calculation processing)). A higher status coincidence degree means higher status similarity.

An example of the status coincidence determination element is the face direction. When determining the coincidence degree of the face direction, the feature points of face parts such as the eye and the mouth are extracted from the image of a recognition target and that of a target registered in the database, and face directions are estimated from the geometrical relationships between the extracted feature points. The estimated face direction of the recognition target (i.e. the object image to be recognized) and that of the target (i.e. the object) registered in the database are compared, thereby determining the status coincidence degree. Note that the status in status coincidence determination suffices to be a factor which influences the precision of the object recognition unit 111, and is not limited to face direction. That is, the status used here is defined in accordance with the system and algorithm of the object recognition unit 111, and includes "brightness", "expression", "concealment degree", and "size" in addition to face direction. A method of determining the coincidence degree of each status will be exemplified. When "brightness" is used as the status, the average of luminance values in the image of a recognition target and that of luminance values in the image of a target registered in the database are calculated, and in the case where the difference between the averages is 20% or less of an average calculated from a database image, it is determined that the luminance statuses coincide with each other, and a higher status coincidence degree is given for a lower percentage. As the image becomes darker, it becomes more difficult to extract information about face parts used to obtain a recognition evaluation value by the object recognition unit 111. Thus, the reference value of 20% may be changed to a stricter (i.e. lower) value for a lower database image luminance. When "expression" is used, the feature points of face parts such as the eye and the mouth are extracted from the image of a recognition target and that of a target registered in the database, and the facial expression in each image is determined from the degree of opening of the eye (eye height with respect to the eye width), the mouth shape (whether the two corners of the mouth are higher than its center), the position of the corner of the eye, and the like. For example, when the corner of the eye is down, the degree of opening of the eye is low, and the two corners of the mouth are up, it is determined that a person is smiling. As for the expression, it is determined that the statuses coincide with each other only when the determined expressions coincide with each other. When "concealment degree" is used, concealing features such as a mask and spectacles are detected from the image of a recognition target and that of a target registered in the database, and the difference between the ratios of the area of concealing features (or, indeed, the concealed portions of the object) detected in respective images to the area of the object (such as a face) is 5% or less of the ratio of the area of a concealing feature in a database image with respect to the object (i.e. the face), it is determined that the concealing feature statuses coincide with each other, and a higher status coincidence degree is given for a lower percentage. When "size" is used, and a face size output from the object detection unit 109 is half or less of a face size registered in the database, it is determined that the size statuses do not coincide with each other. Otherwise, a higher status coincidence degree is given when the sizes are closer to each other.

Then, the object recognition unit 111 compares the image feature of the object image extracted by the object detection unit 109 with that of an object registered in the database 112, calculating the recognition evaluation value in the second calculation processing (step S204). The recognition evaluation value indicates the similarity between the object image to be recognized and the object registered in the database 112. A larger recognition evaluation value means that the recognition target and the object registered in the database 112 are more highly likely to coincide with each other. When a plurality of objects exists in the database 112, the processing (step S203) by the status determination unit 110 and the processing (step S204) by the object recognition unit 111 are executed by the number of objects registered in the database 112. That is, for one recognition target, status coincidence degrees and recognition evaluation values are obtained by the number of objects registered in the database 112.

The object recognition unit 111 compares the recognition evaluation value with the first threshold, and if the recognition evaluation value is equal to or larger than the first threshold, determines that the recognition target is an object coincident with one registered in the database 112 (YES in step S205→step S206). If the recognition evaluation value is smaller than the first threshold (NO in S205), the object recognition unit 111 compares the status coincidence degree with the second threshold. If the status coincidence degree is equal to or higher than the second threshold, that is, the status of the object to be recognized coincides with that of the object registered in the database, the object recognition unit 111 determines that the recognition target is an object different from one registered in the database 112 (YES in step S207→step S208). If the status coincidence degree is lower than the predetermined threshold (NO in step S207), the object recognition unit 111 determines that the determination is impossible, without determining whether the recognition target differs from or coincides with the object in the database, and the determination becomes impossible (NO in step S207→step S209).

Figure 3:
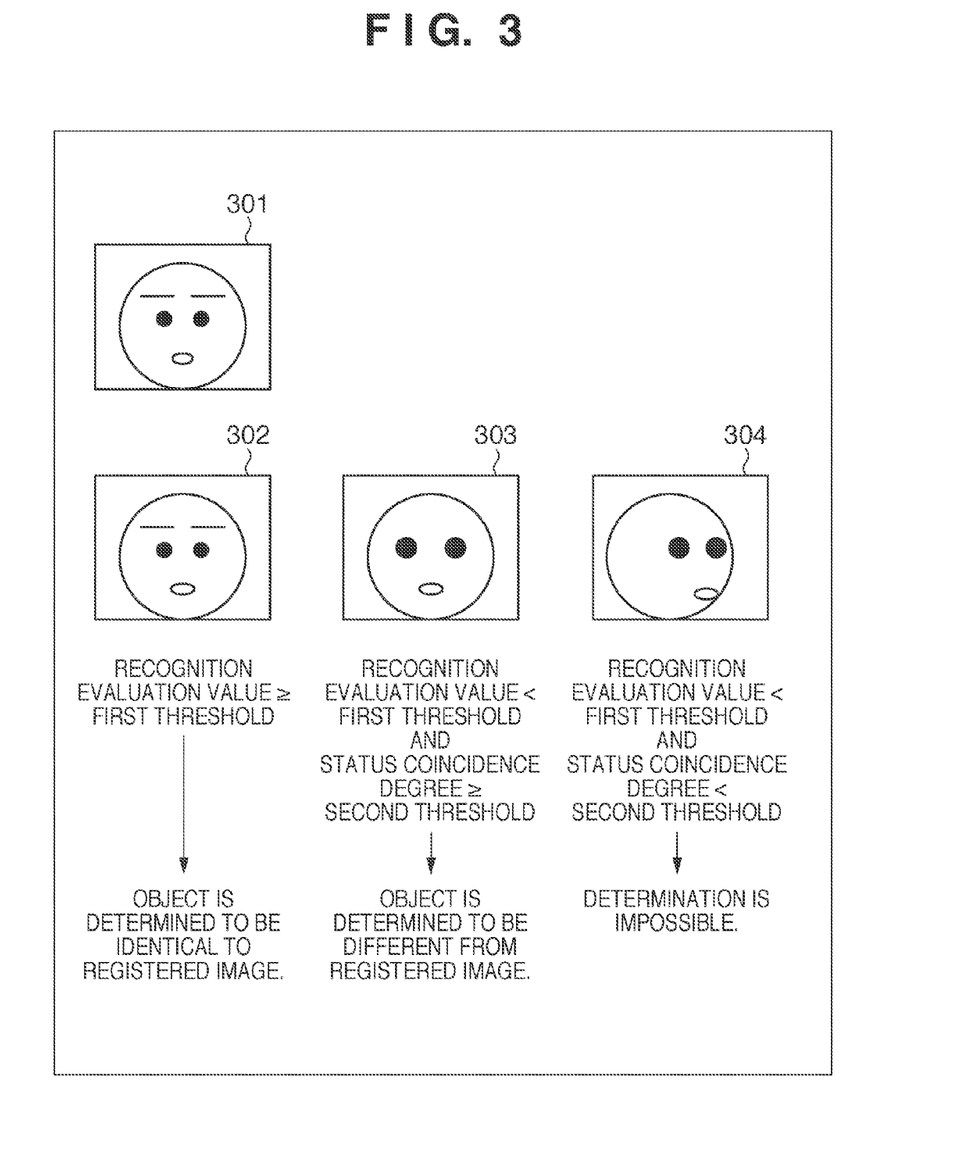
FIG. 3 is a diagram exemplifying the recognition processing according to the first embodiment.

The above-described object recognition processing according to the first embodiment will be exemplified with reference to FIG. 3. In FIG. 3, the status determination unit 110 determines the coincidence degree of the face direction. In FIG. 3, reference numeral 301 denotes an image registered in the database; and 302 to 304, input images. The recognition evaluation value of the input image 302 with the registered image 301 is equal to or larger than the first threshold, so it is determined that the recognition target is an object identical to one in the database. The recognition evaluation value of the input image 303 with the registered image 301 is smaller than the first threshold, the status coincidence degree is equal to or higher than the second threshold (i.e. both images have faces facing the same way, so a difference in recognition evaluation value is not because of a difference in status), and thus it is determined that the recognition target is an object different from a target registered in the database. The recognition evaluation value of the input image 304 with the registered image 301 is smaller than the first threshold, the status coincidence degree is lower than the second threshold, and thus it is not determined whether the recognition target is an object identical to or different from a target registered in the database. In other words, determination of whether the object from the input image is the same as the stored object image is impossible.

As described above, according to the first embodiment, a recognition evaluation value obtained by object recognition, and a status coincidence degree regarding the object status are obtained for an object image to be recognized when compared with an object registered in the database. When the recognition evaluation value is smaller than a predetermined threshold, it is determined by referring to the status coincidence degree whether the recognition target is different from the registered object. In other words, it can be more accurately determined that the recognition target is an object not registered in the object recognition database.

Figure 2:
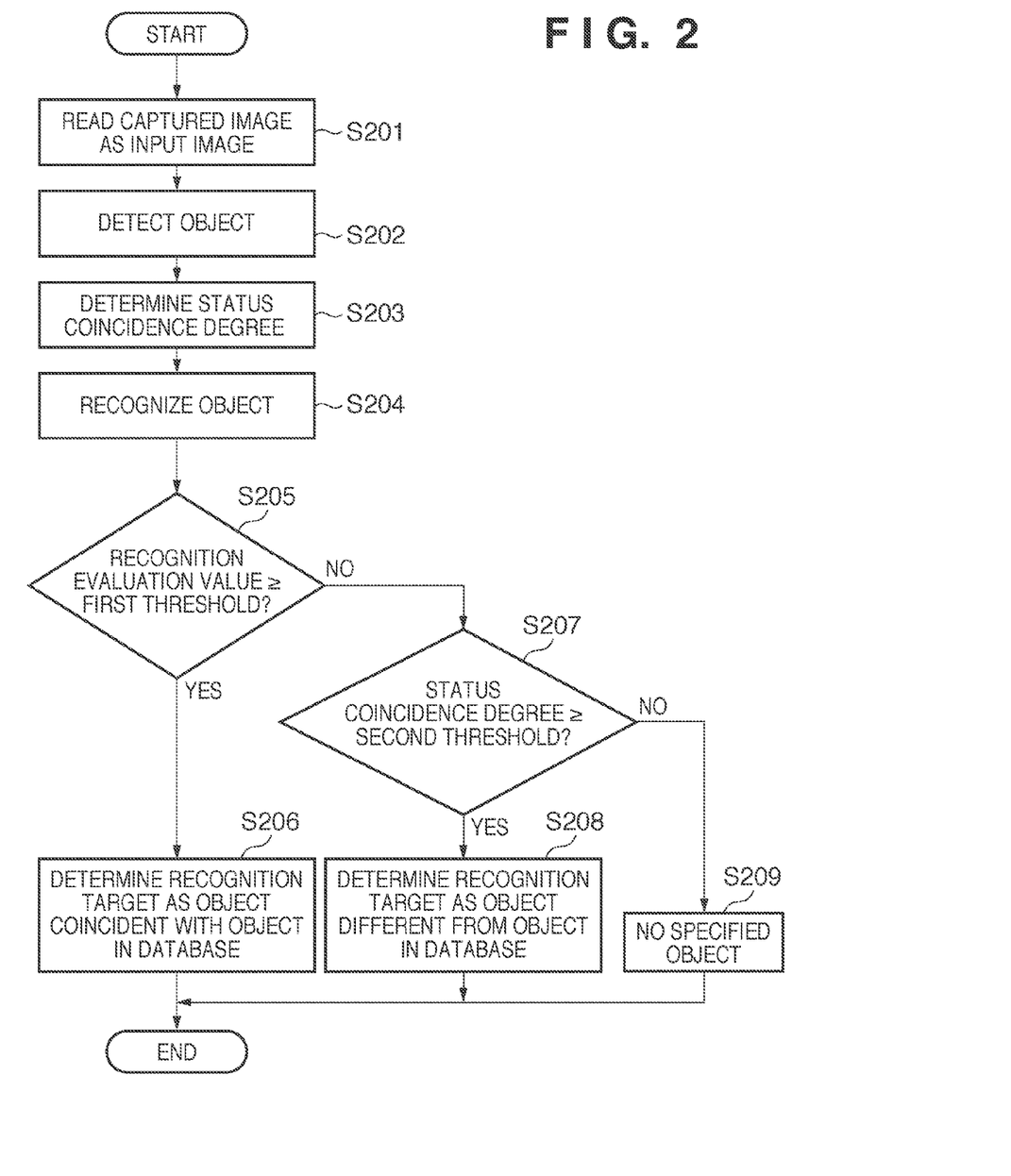
FIG. 2 is a flowchart showing recognition processing according to the first embodiment.

In step S207 as shown in FIG. 2, determination is made using only the status coincidence degree, but the present invention is not limited to this. For example, when the recognition evaluation value obtained in step S204 is smaller than a third threshold (where the third threshold is smaller than the first threshold), and the status coincidence degree is higher than the second threshold (S207), it may be determined that the recognition target is different from an object registered in the database (step S208). Also, the process may advance from step S205 to step S206 only when the recognition evaluation value is equal to or larger than the first threshold and the status coincidence degree is equal to or higher than a fourth threshold, the fourth threshold being the same as or different from the second threshold, but included in an embodiment where both S205 and S207 must be satisfied for the result of S206 to be positive. With this setting, only when the similarity is high and the status is coincident to a certain degree, it can be determined that the object to be recognized coincides with an object registered in the database. To register an object image in the database 112, it is sufficient for the user to assign an ID to a person, select an image corresponding to the ID from acquired images, and store it in the database 112. It is also possible, when the object recognition unit 111 obtains a recognition evaluation value higher than the first threshold by a predetermined value or more, automatically to add an image having the recognition evaluation value to the database 112 as a specific person's image having that recognition evaluation value.

Second Embodiment

Figure 4:
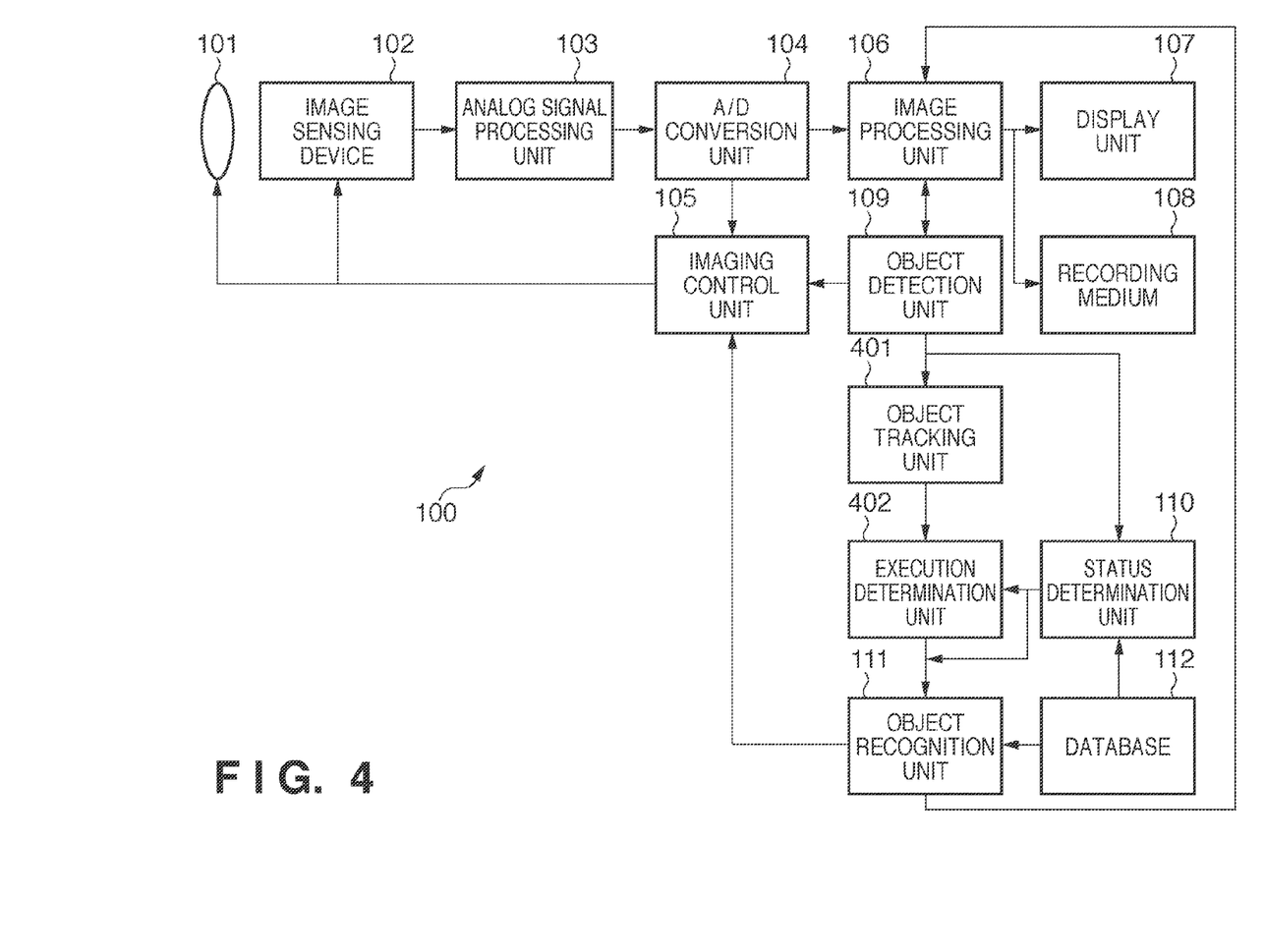
FIG. 4 is a block diagram exemplifying the arrangement of an image capturing apparatus according to the second embodiment.

FIG. 4 is a block diagram showing an image capturing apparatus according to the second embodiment. A difference of the arrangement and operation of an image capturing apparatus 100 according to the second embodiment from those in the first embodiment will be mainly explained. In FIG. 4, the same reference numerals as those in FIG. 1 denote units which have the same arrangements and execute the same operations and processes as those in the first embodiment.

An object tracking unit 401 tracks the same object between successive frames based on position and size similarities between detection results supplied from an object detection unit 109 for the successive frames. By specifying the same object in the moving image, the past result of an object recognition unit 111 for the object can be held and applied.

An execution determination unit 402 determines whether the object recognition unit 111 is to execute recognition processing for each object extracted by the object detection unit 109. Also, the execution determination unit 402 selects an object to undergo recognition processing for the recognition target, from objects registered in a database 112. Arranging the execution determination unit 402 as shown in FIG. 4 allows the use of the result of a status determination unit 110 and the past result of the object recognition unit 111, and the selection of an object to undergo recognition processing (by the object recognition unit 111) from objects registered in the database 112.

If the object tracking unit 401 can specify the same object in a moving image which is continuous in time series, the past result of the object recognition unit 111 can be inherited, omitting further recognition processing by the object recognition unit 111. That is, when the recognition evaluation value satisfies a predetermined threshold and it is determined that the object has been registered in the database 112, this determination can be inherited by specifying the object by the object tracking unit 401 in subsequent frames.

In the first embodiment described above, if the recognition evaluation value obtained by the object recognition unit 111 is smaller than a predetermined threshold and the coincidence degree obtained by the status determination unit 110 is high, it is determined that the recognition target is different from an object registered in the database 112. In the present embodiment, recognition processing with the object registered in the database 112 can be omitted for the same recognition target in consecutive frames. Assuming that a plurality of types of image features and statuses are registered for the same object (i.e. an object with the same identification) in the database 112, and it is determined from collation with one of the image features and/or statuses that the recognition target is different from the registered object. In this case, recognition processing with the recognition target can be omitted for all the image features and statuses registered in the database 112 in regard to the object. Further, when an object to undergo recognition processing by the object recognition unit 111 does not remain, it can be determined that the recognition target is an object not registered in the database.

Figure 5:
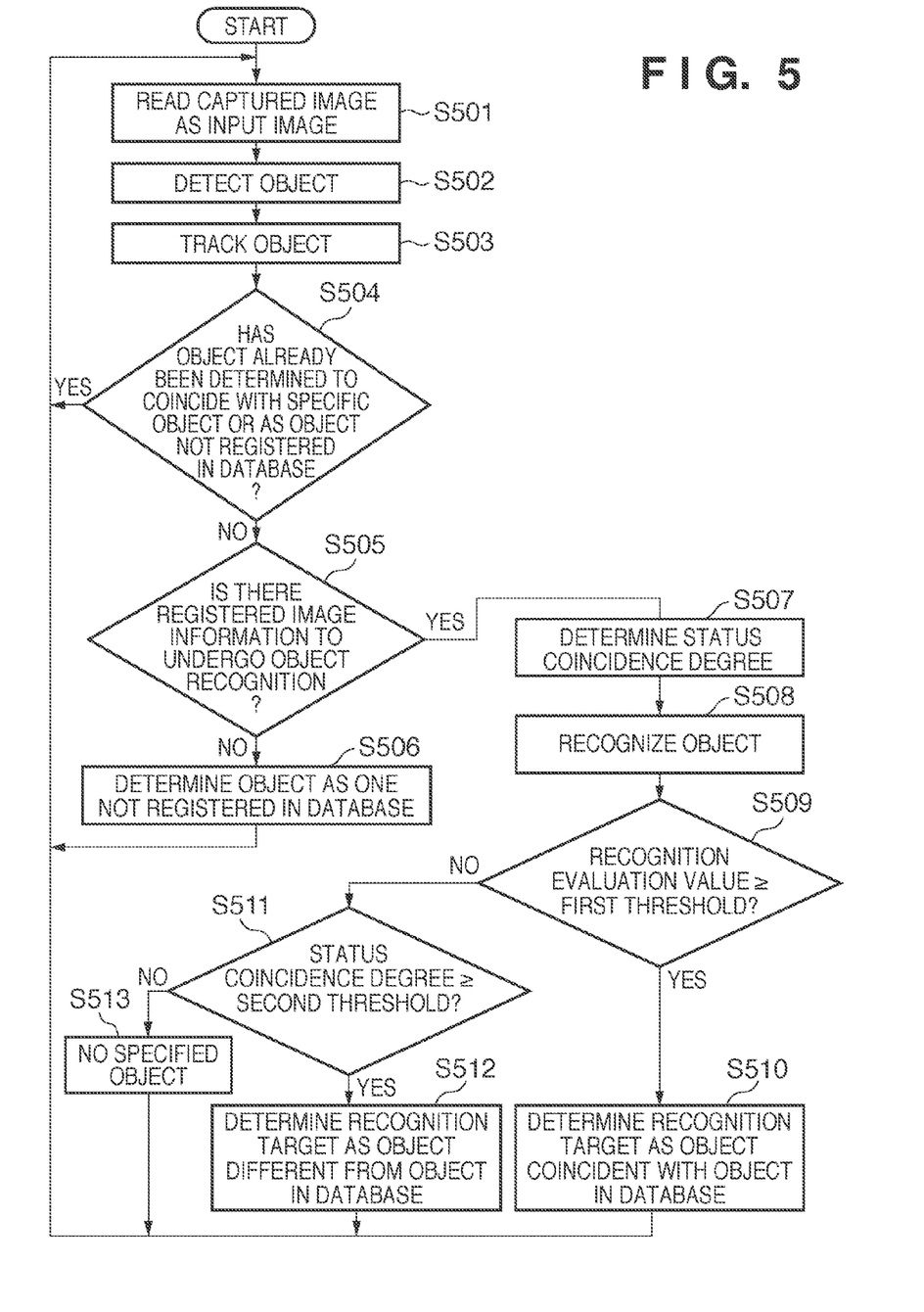
FIG. 5 is a flowchart showing recognition processing according to the second embodiment.

The sequence of this object recognition processing according to the second embodiment will be explained with reference to FIG. 5.

In steps S501 and S502, which are the same as steps S201 and S202 in FIG. 2, the object detection unit 109 obtains an object region (object image) from an input image obtained by digitizing a captured image. Steps S503 to S513 are executed for each object extracted by the object detection unit 109. The object tracking unit 401 tracks a same object between frames which are successive in time series (step S503). More specifically, if an object—whose position and size similarities between the successive frames satisfy predetermined criteria—exists among objects detected by the object detection unit 109, the object tracking unit 401 determines that an identical object exists. If an object—whose position and size similarities between successive frames satisfy predetermined criteria—does not exist, the object tracking unit 401 regards the object as one which newly appears.

The execution determination unit 402 determines, for the object (recognition target) determined by the object tracking unit 401 not to be a new object, whether it has been determined in a past frame that the object coincides with a specific object registered in the database 112, or whether it has been determined in a past frame that the object has not been registered in the database (whether it has been determined that the object is different from all objects registered in the database 112) (step S504). If it has been determined that the recognition target coincides with a specific object, or that the recognition target has not been registered in the database, the execution determination unit 402 returns the process to step S501 (YES in step S504) to skip determination of the status coincidence degree and object recognition processing for the object. If it has not been determined that the recognition target coincides with a specific object registered in the database and it has not been determined that the recognition target is different from all objects registered in the database 112, the object recognition unit 111 determines whether registered image information to undergo object recognition for the recognition target remains in the database 112 (NO in step S504→step S505). If registered image information to undergo object recognition does not remain in the database 112, the recognition target is different from all objects registered in the database 112. Thus, the object recognition unit 111 determines that the recognition target has not been registered in the database (NO in step S505→step S506). After that, the process returns to step S501.

To the contrary, if registered image information to undergo object recognition for the target object (recognition target) remains in the database 112, processes in steps S507 to S513 are executed. Note that steps S507 to S513 are executed for all images registered in the database 112 that have been determined in step S505 (YES in S505) to undergo object recognition for the recognition target. First, the status determination unit 110 determines the status coincidence degree of the recognition target to undergo object recognition (step S507). The processes in steps S507 to S513 are the same as those in steps S203 to S209 of FIG. 2. Through the processes in steps S507 to S513, one of the following results is obtained:

the recognition target coincides with an object registered in the database (step S510),
the recognition target is different from an object registered in the database (step S512), and
determination is impossible (step S513). If it is determined in step S512 that the recognition target is different from an object registered in the database, registered image information associated with the registered object is excluded from objects to undergo recognition for the recognition target. In step S510, registered image information associated with an object determined to coincide with the recognition target may be excluded from registered image information to undergo recognition for another recognition target. For example, if there are not multiple recognition targets in one image where face recognition or the like has been performed, unnecessary recognition processing can be eliminated. In this way, the results are inherited to the next frame (step S503), it is determined whether to execute object recognition (step S504), and an object in the database that is to undergo object recognition is selected (step S505). The second embodiment can therefore shorten the processing time.

Figure 6:
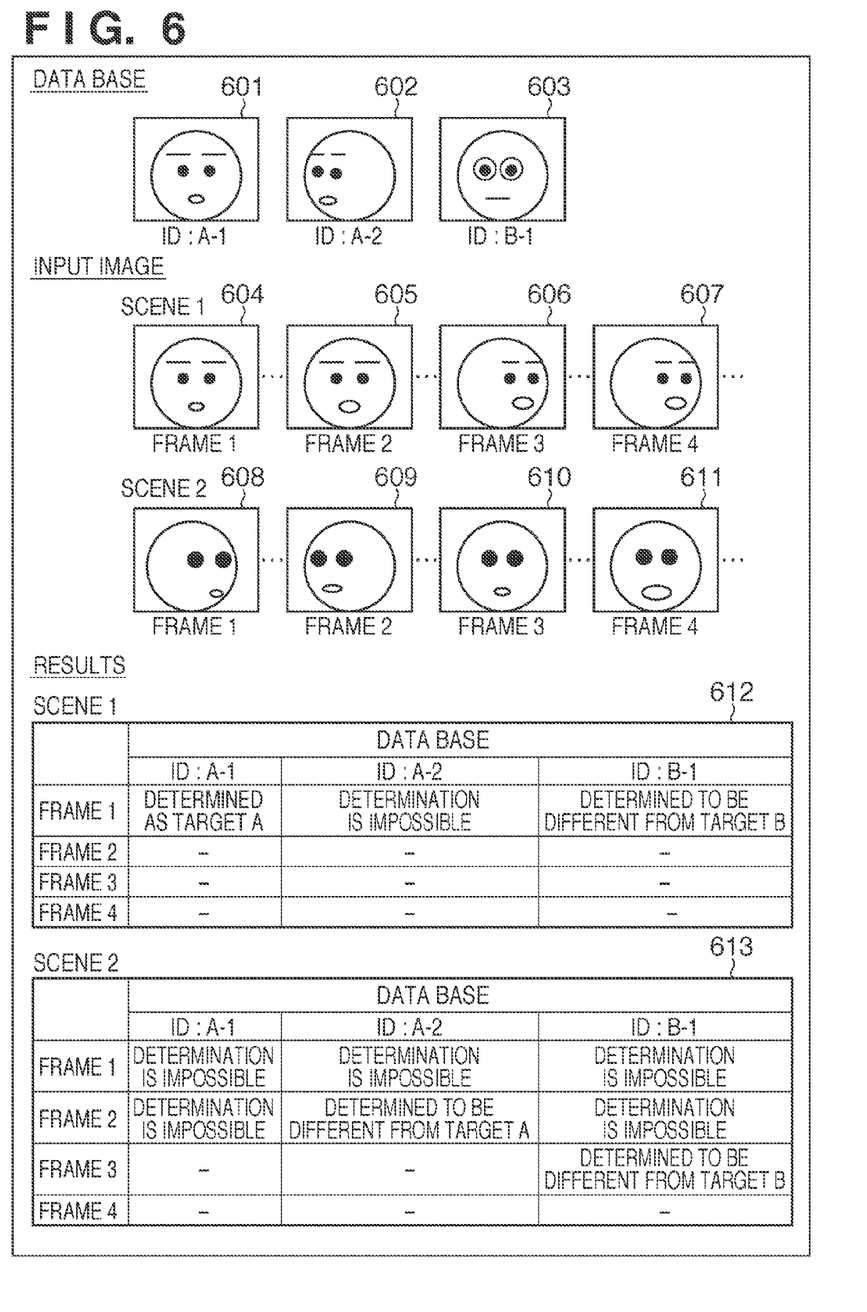
FIG. 6 is a diagram exemplifying the recognition processing according to the second embodiment.

The result of object recognition according to the second embodiment will be exemplified with reference to FIG. 6. In FIG. 6, the status determination unit 110 determines the coincidence degree of the face direction. In FIG. 6, reference numerals 601 to 603 denote registered images of objects registered in the database. The registered images 601 and 602 represent identical objects (target A) in different face directions and are given the identifications (ID) A-1 and A-2 respectively. The registered image 603 represents an object (target B with ID B-1) different from the object of the registered images 601 and 602. Reference numerals 604 to 607 denote input images in scene 1; and 608 to 611, input images in scene 2. Reference numeral 612 denotes an object recognition execution result table for scene 1; and 613, an object recognition execution result table for scene 2. The execution result tables 612 and 613 are updated in steps S510, S512 and S513.

The execution results for scene 1 will be explained. In frame 1, the recognition evaluation value of the recognition target for an image with the database ID: A-1 is equal to or larger than a threshold, so it is determined that the recognition target coincides with a target in the database. In recognition processing for image with database ID: A-2, the recognition evaluation value is smaller than the threshold, the status coincidence degree is lower than a threshold, and it is determined that the determination is impossible. In recognition processing for the image with database ID: B-1, the recognition evaluation value is smaller than the threshold, the status coincidence degree is equal to or higher than the threshold, and it is determined that the recognition target is an object different from target B. Since it is determined that the recognition target in frame 1 is target A indicated by the database ID: A-1, this result is inherited to frame 2 and subsequent frames, and neither object recognition nor determination of the status coincidence degree is executed (NO in step S504). This is indicated as blanks in the results table 612. The first input image 604 has been determined as being the same as the registered image with ID: A-1 and so this reference can be used for the rest of the frames 2 to 4 where the same face is imaged.

The execution results for scene 2 will be explained. In frame 1, it is determined that the recognition evaluation values of the recognition target for the database ID: A-1, ID: A-2, and ID: B-1 are smaller than the threshold, the status coincidence degrees are lower than the threshold, and it is determined that the determination is impossible. Thus, even in frame 2, object recognition and determination of the status coincidence degree are executed for all objects registered in the database. As the result of frame 2, it is determined for the database ID: A-1 and ID: B-1 that the determination is impossible because the recognition evaluation value is smaller than the threshold and the status coincidence degree is lower than the threshold. For the database ID: A-2, it is determined that the recognition target is an object different from target A indicated by the database ID: A-2 because the recognition evaluation value is smaller than the threshold and the status coincidence degree is equal to or higher than the threshold. This result (that the recognition target is not target A) is inherited, and neither object recognition nor determination of the status coincidence degree is executed for the database ID: A-1 and ID: A-2 in frame 3. Hence, object recognition and determination of the status coincidence degree are executed only for the database ID: B-1 in frame 3 of the input image. As the result of frame 3, it is determined that the recognition target is an object different from target B indicated by the database ID: B-1 because the recognition evaluation value for the database ID: B-1 is smaller than the threshold and the status coincidence degree is equal to or higher than the threshold. Since it is determined that the recognition target in scene 2 is different from all targets (targets A and B in this example) in the database, it is determined that the recognition target has not been registered in the database (step S506). In frame 4 and subsequent frames, neither object recognition nor determination of the status coincidence degree is executed for the object, as the object in the frames is known not to be one of those in the database.

As described above, according to the second embodiment, a determination result obtained in a past frame by object recognition and determination of the status coincidence degree for the identical recognition target is inherited, increasing the processing efficiency.

Preferred embodiments of the present invention have been described, but the present invention is not limited to them and can be variously changed and modified without departing from the scope of the invention. Some possible modifications of the present invention are as follows.

In the above-described embodiments, the processing can be made more efficient based on the result of the status determination unit 110. For example, when the status coincidence degree of the recognition target with a target in the database is low, the object recognition unit 111 is less likely to obtain a recognition evaluation value which satisfies a predetermined threshold. Thus, when the status coincidence degree of the recognition target with a target in the database is low, processing by the object recognition unit 111 based on the database may be omitted for the frame.

In the above-described embodiments, a person's face is detected as an object. However, the present invention is not limited to a person's face, and is applicable to even the face of an animal such as a pet. The present invention is not limited to the face, and is applicable to a person, animal, automobile, and the like as long as object recognition is executed to extract and specify a target object.

The above embodiments have described an image capturing apparatus, but the present invention is not limited to the image capturing apparatus and is applicable to even a reproduction apparatus such as a printer or display screen. The present invention can be applied to the reproduction apparatus by using reproduction data as data of object recognition processing.

The above-described embodiments can more accurately determine that an object detected from an image has not been registered in a database compared with simply comparing an input image with a database image.

Aspects of the present invention can also be realized by a computer of a system or apparatus (or devices such as a CPU (central processing unit) or MPU (microprocessing unit) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-028207, filed Feb. 10, 2010, which is hereby incorporated by reference herein in its entirety.

What is claimed is:

1. An image recognition apparatus configured to recognize an object in an input image, the apparatus comprising:
   a database in which an image or an image feature obtained by imaging an object, and an object recognizability state of the object are registered as registered image information in association with an identification of the object;
   a first calculation unit configured to calculate a coincidence degree between an object recognizability state of an input object image and an object recognizability state in the registered image information;
   a second calculation unit configured to calculate a similarity between an image feature of the input object image and an image feature in the registered image information; and
   a recognition unit configured to execute recognition processing to recognize, based on the similarity and the coincidence degree, whether an object of the input object image is the same object as the object of the registered image information,
   wherein when the second calculation unit calculates that the similarity is lower than a first threshold and the first calculation unit calculates that the coincidence degree is equal to or higher than a second threshold, said recognition unit is configured to recognize that the object of the input object image is different from the object of the registered image information.

2. The apparatus according to claim 1, wherein when the second calculation unit calculates that the similarity is equal to or higher than the first threshold, said recognition unit is configured to recognize that the object of the object image is the object of the registered image information.

3. The apparatus according to claim 1, wherein when the second calculation unit calculates that similarity is lower than the first threshold and the first calculation unit calculates that the coincidence degree is lower than the second threshold, said recognition unit is configured to determine that determination of whether the object of the object image is the object of the registered image information is impossible.

4. The apparatus according to claim 1, further comprising:
   an input unit configured to input, as the input image, successive images which form a moving image;
   a tracking unit configured to track an input object image over at least two frames of the moving image; and
   a determination unit configured to determine whether the recognition unit is to execute the recognition processing for the input object image tracked by said tracking unit and the registered image information registered in said database,
   wherein said determination unit is configured to determine whether the recognition unit is to execute the recognition processing for the object image tracked by said tracking unit using, from the registered image information registered in said database, registered image information excluding registered image information the object of which has already been determined to be different from the object of the input object image.

5. The apparatus according to claim 4, wherein
   the database is configured to contain plural pieces of registered image information for one object, and
   said determination unit is configured to determine whether the recognition unit is to execute the recognition processing for at least one frame of the input object image tracked by said tracking unit using, from the registered image information registered in said database, registered image information excluding all pieces of the registered image information regarding an object which has already been determined to be different from the object of the input object image.

6. The apparatus according to claim 4, wherein, when all registered image information has been determined as having an object different from the input object image, said recognition unit is configured to determine the object of the input object image as being an unregistered object.

7. The apparatus according to claim 4, wherein, when the object of the input object image has already been determined as being the same as the object of the registered image information, said determination unit is configured to determine that the recognition unit is not to execute the recognition processing for the object image tracked by said tracking unit.

8. The apparatus according to claim 1, wherein said second calculation unit is configured to calculate the similarity with the input object image for only registered image information for which the coincidence degree is higher than the second threshold.

9. The apparatus according to claim 1, wherein the object recognizability state includes at least one of object orientation, object brightness, object concealment degree and facial expression where the object is a face.

10. A method of controlling an image recognition apparatus which recognizes an object in an input image, the method comprising:
    a registration step of registering an image or an image feature obtained by imaging an object, and an object recognizability state regarding the object, as registered image information in a database in association with an identification of the object;
    a first calculation step of calculating a coincidence degree between an object recognizability state of an input object image and an object recognizability state in the registered image information;
    a second calculation step of calculating a similarity between an image feature of the input object image and an image feature in the registered image information; and
    a recognition step of executing recognition processing to recognize, based on the similarity and the coincidence degree, whether an object of the input object image is the same object as the object of the registered image information,
    wherein, when it is calculated that the similarity is lower than a first threshold and the coincidence degree is equal to or higher than a second threshold, the object of the input object image is recognized in the recognition step to be different from the object of the registered image information.

11. A non-transitory computer readable storage medium which stores a program for causing a computer to execute a method of controlling an image recognition apparatus which recognizes an object in an input image, the method comprising:
    a registration step of registering an image or an image feature obtained by imaging an object, and an object recognizability state regarding the object, as registered image information in a database in association with an identification of the object;
    a first calculation step of calculating a coincidence degree between an object recognizability state of an input object image and an object recognizability state in the registered image information;

a second calculation step of calculating a similarity between an image feature of the input object image and an image feature in the registered image information; and a recognition step of executing recognition processing to recognize, based on the similarity and the coincidence degree, whether an object of the input object image is the same object as the object of the registered image information, wherein, when it is calculated that the similarity is lower than a first threshold and the coincidence degree is equal to or higher than a second threshold, the object of the input object image is recognized in the recognition step to be different from the object of the registered image information.

* * * * *